P. WRIGHT.
WIRE TYING MACHINE.
APPLICATION FILED FEB. 7, 1920.
1,389,413.
Patented Aug. 30, 1921.
11 SHEETS—SHEET 3.
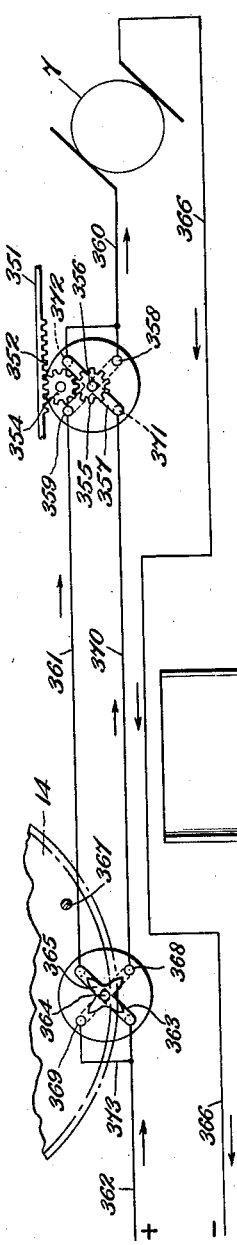
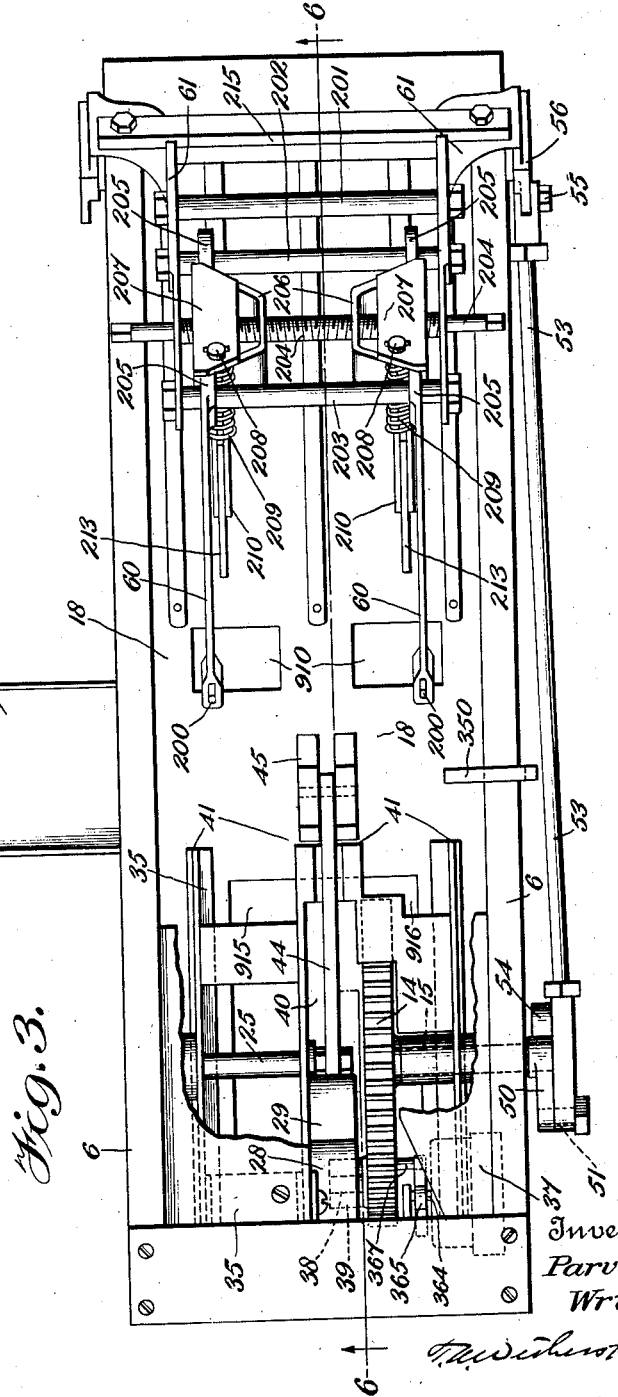
Inventor
Parvin
Wright, by
Attorney

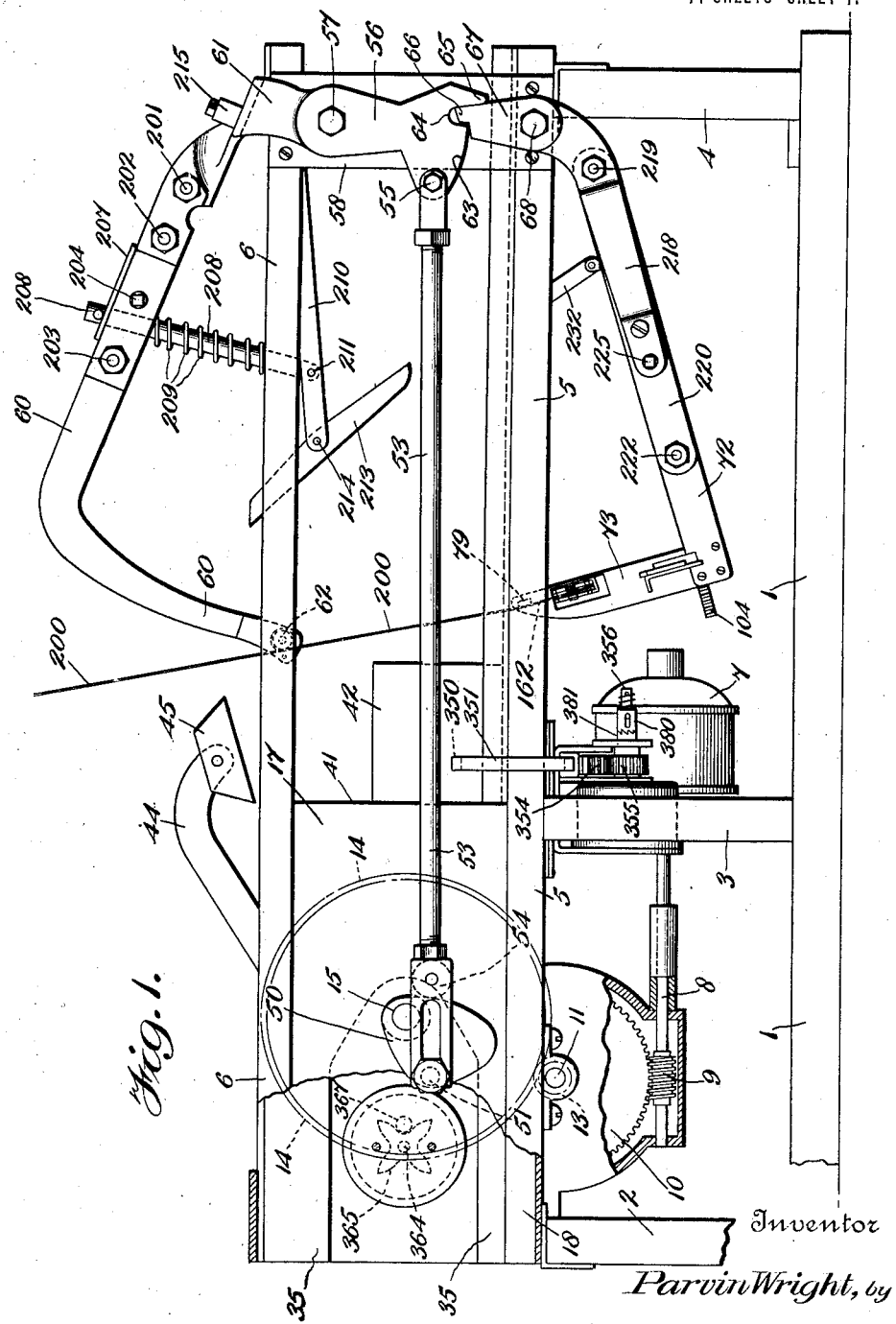

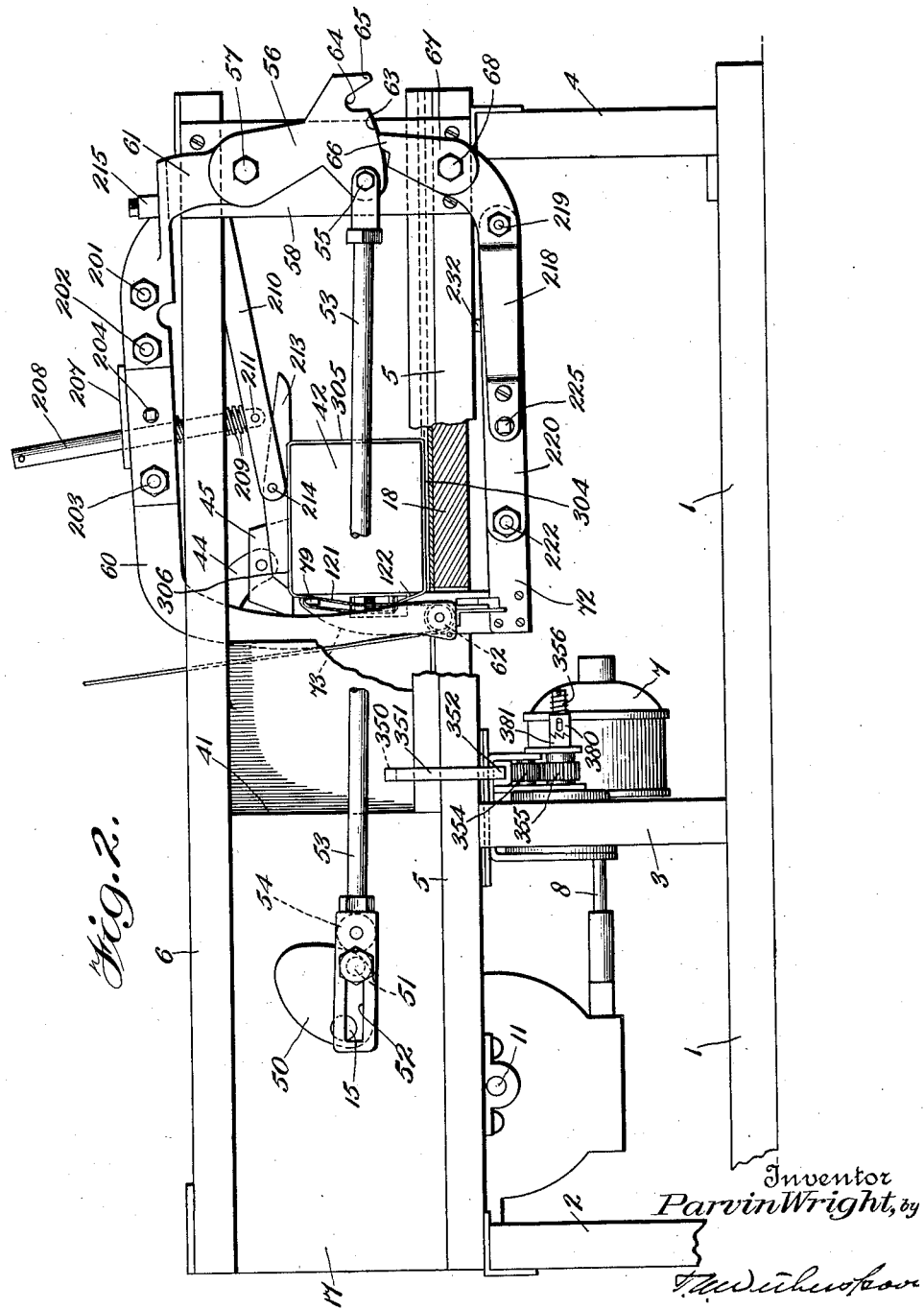

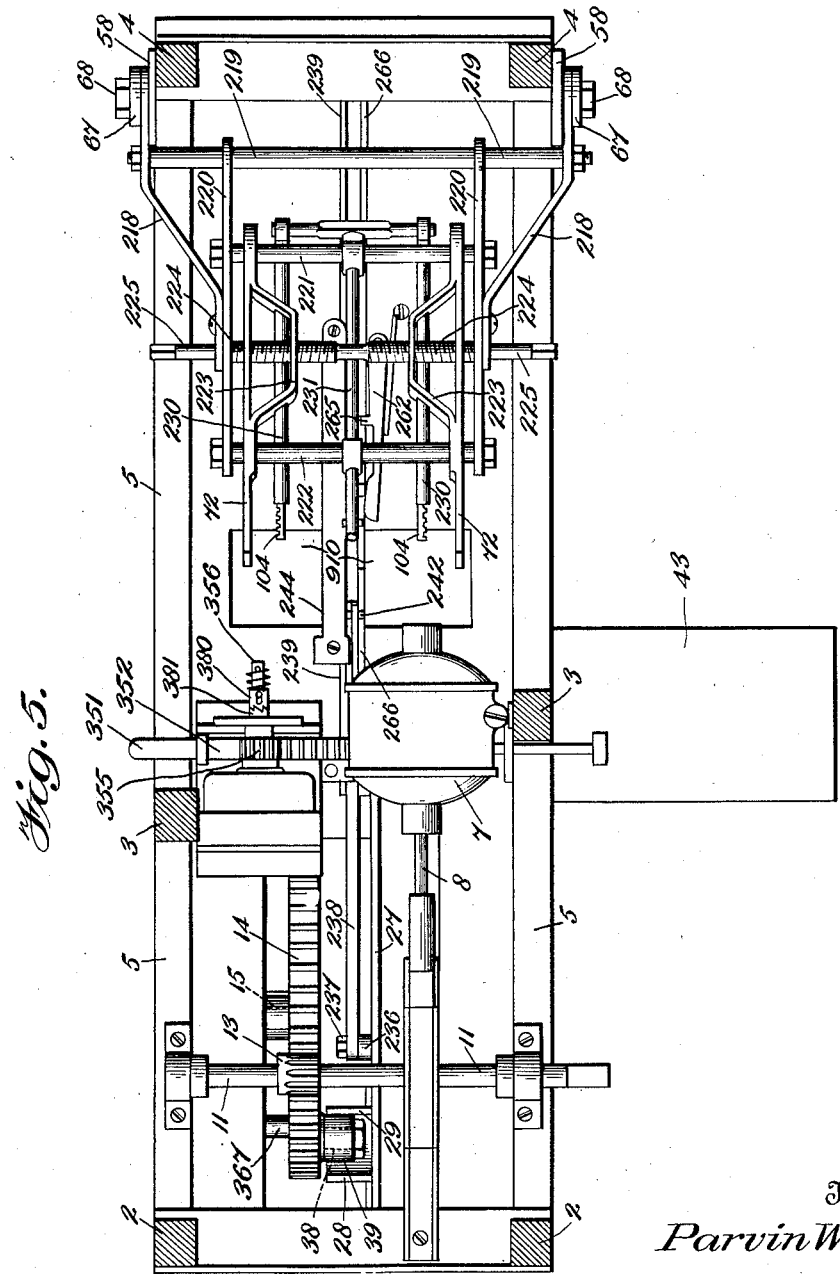

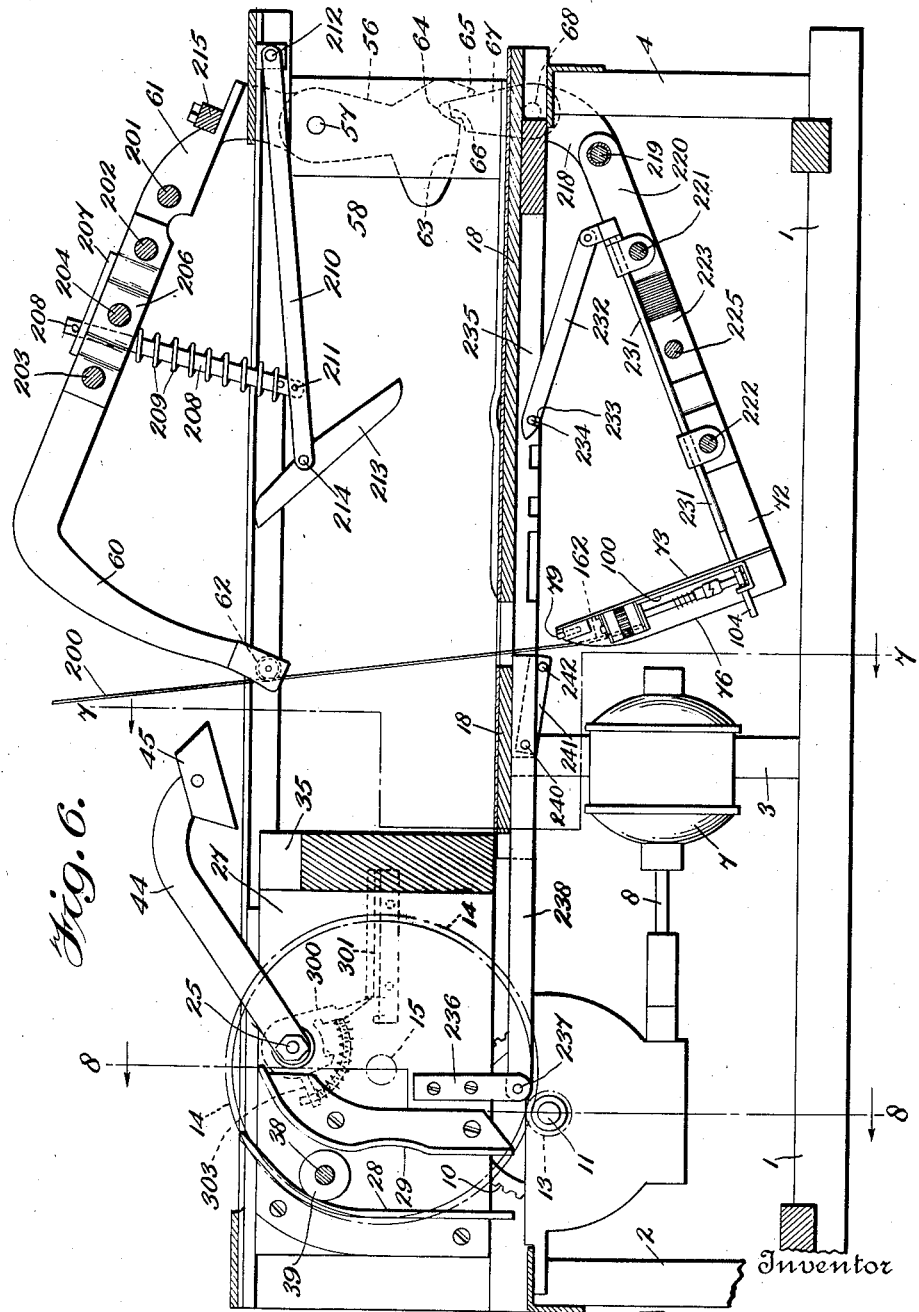

P. WRIGHT.
WIRE TYING MACHINE.
APPLICATION FILED FEB. 7, 1920.
1,389,413.
Patented Aug. 30, 1921.
11 SHEETS—SHEET 6.
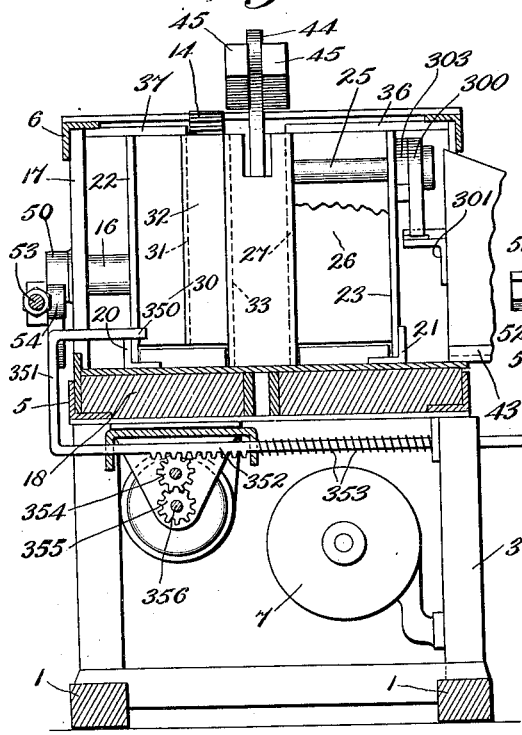
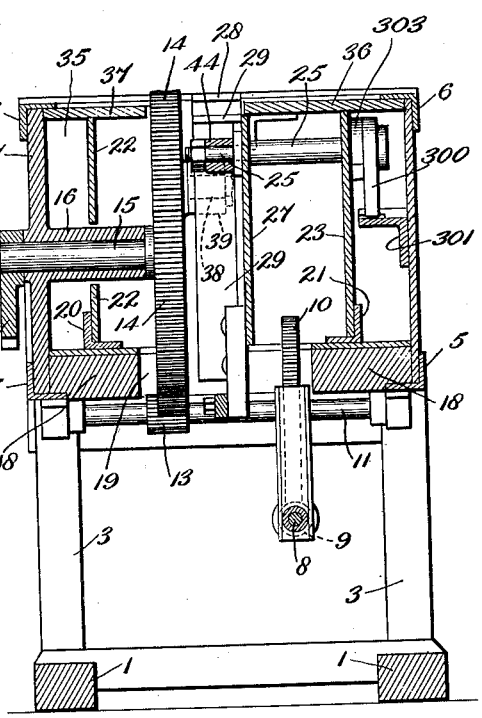
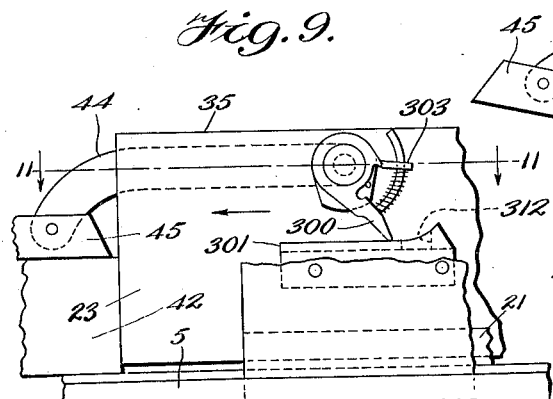
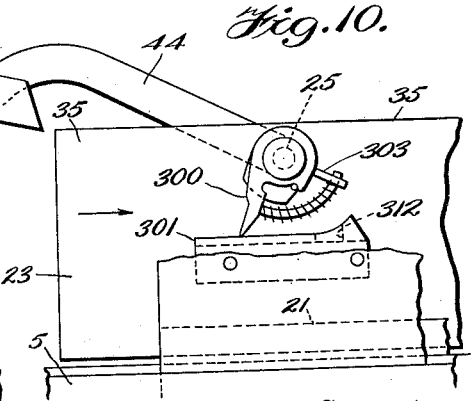
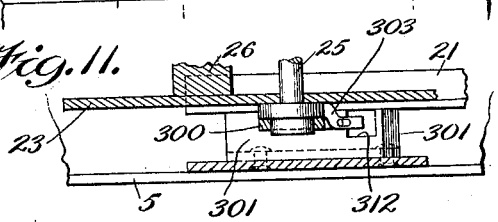
Inventor
Parvin Wright, by
Attorney

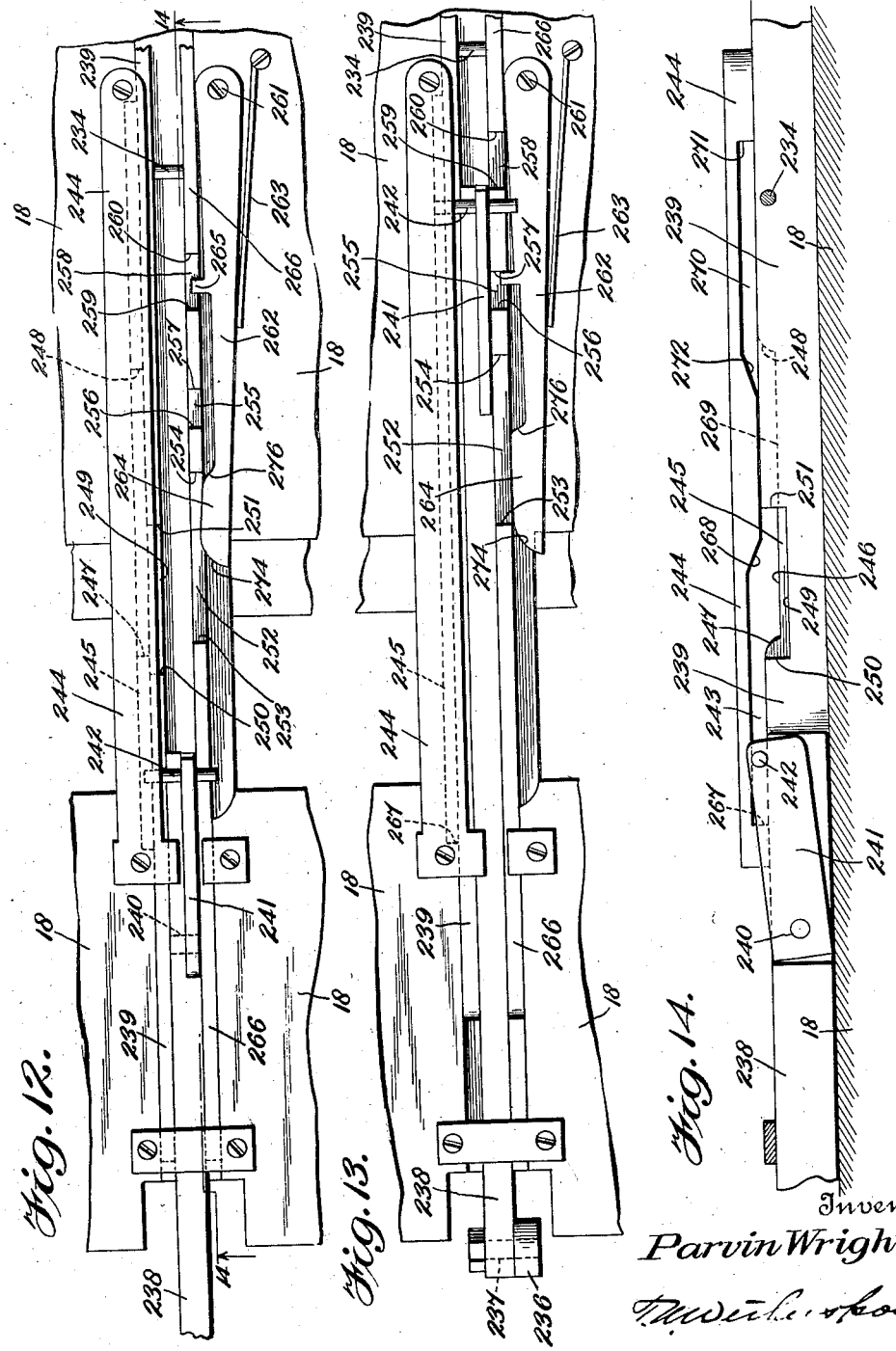

P. WRIGHT.
WIRE TYING MACHINE.
APPLICATION FILED FEB. 7, 1920.
1,389,413.
Patented Aug. 30, 1921.
11 SHEETS—SHEET 8.
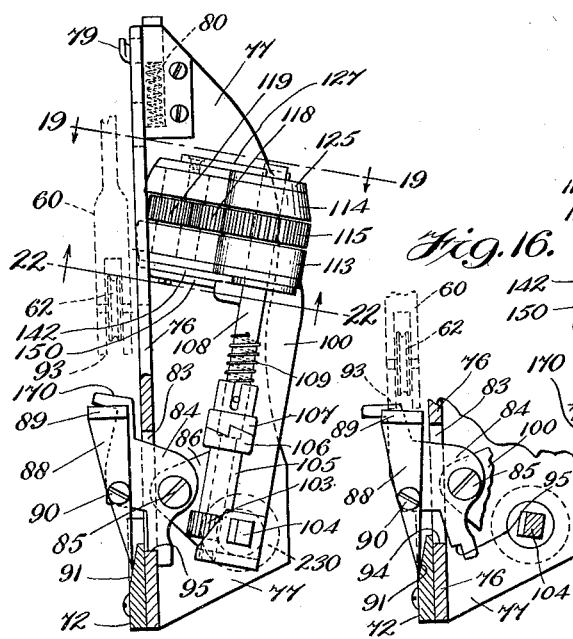
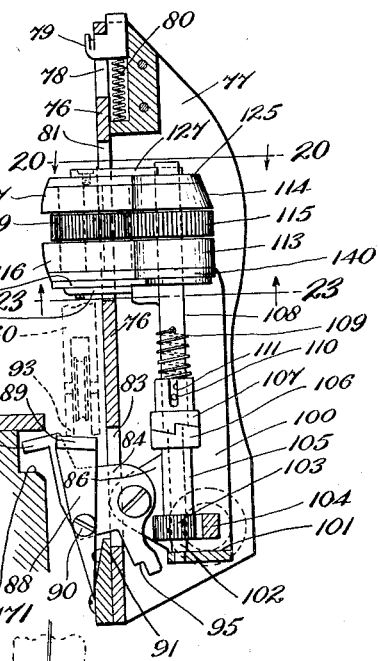
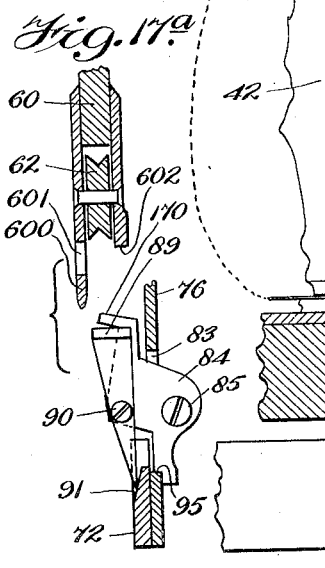
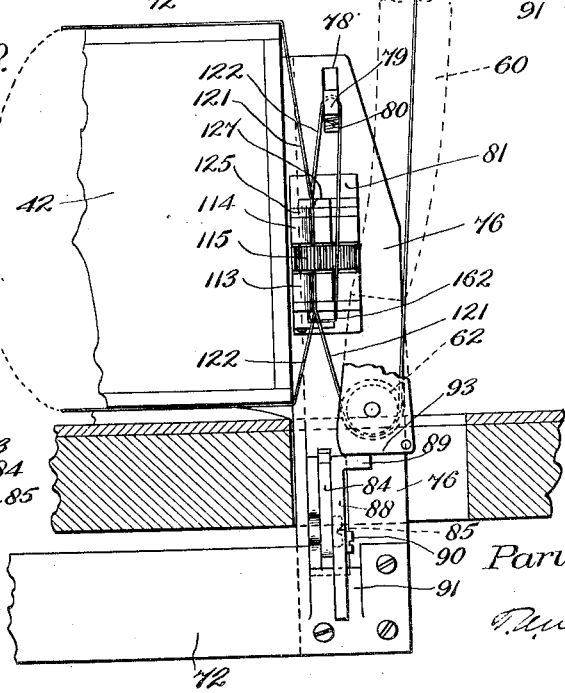
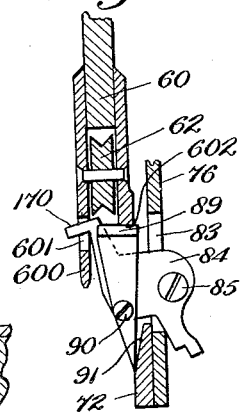
Inventor
Parvin Wright, by
Attorney

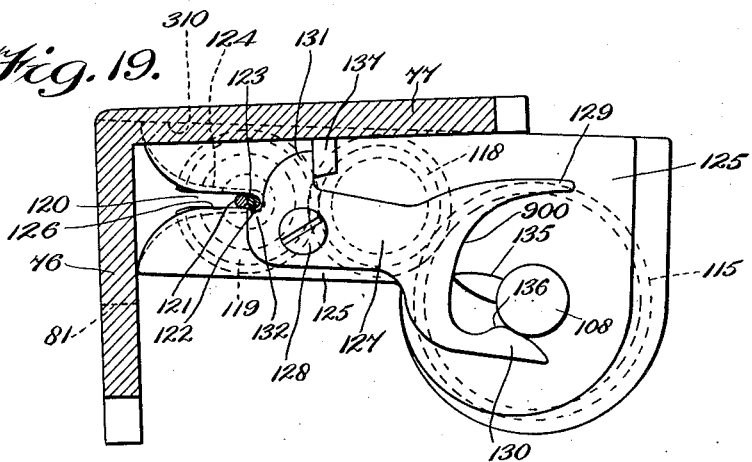

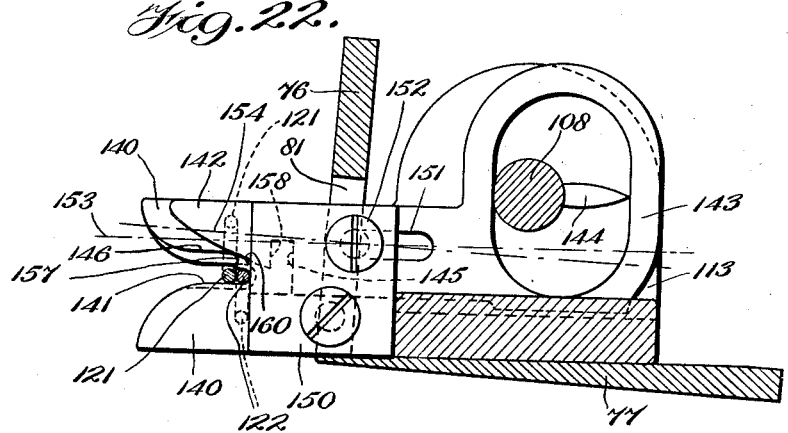
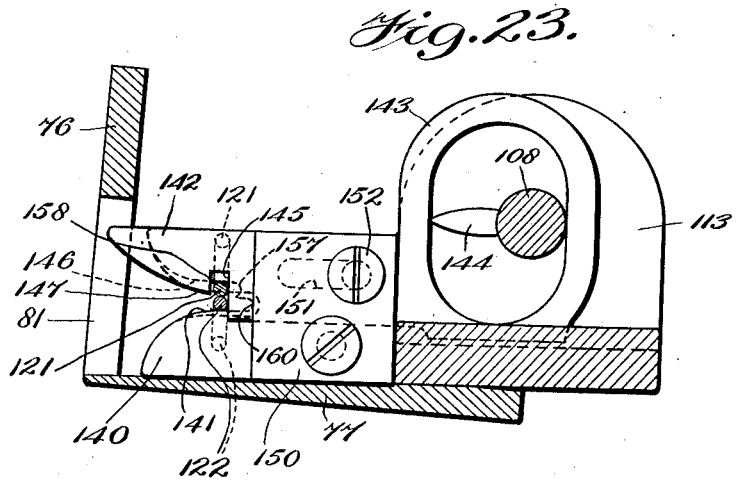

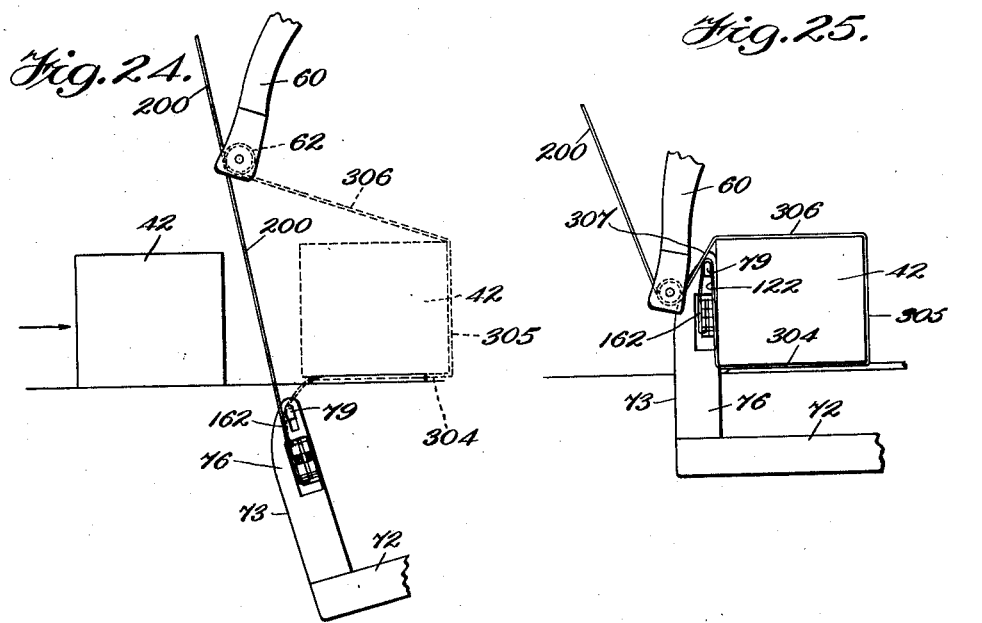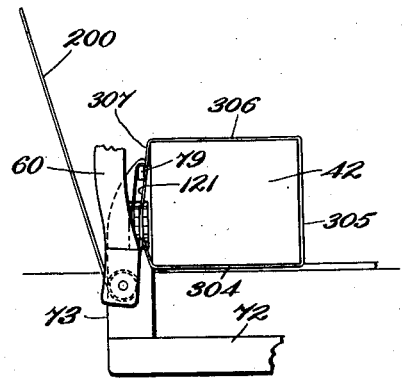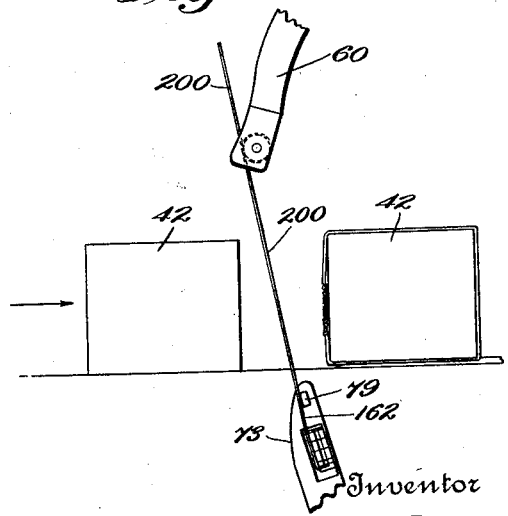

UNITED STATES PATENT OFFICE.

PARVIN WRIGHT, OF CHICAGO, ILLINOIS.

WIRE-TYING MACHINE.

1,389,413.  Specification of Letters Patent.  Patented Aug. 30, 1921.

Application filed February 7, 1920. Serial No. 356,978.

*To all whom it may concern:*

Be it known that I, PARVIN WRIGHT, a citizen of the United States, residing at Chicago, in the county of Cook and State of Illinois, have invented certain new and useful Improvements in Wire-Tying Machines; and I do hereby declare the following to be a full, clear, and exact description of the invention, such as will enable others skilled in the art to which it appertains to make and use the same.

This invention relates to wire tying machines for boxes, bales, etc., and has for its object to provide an automatic mechanism which will be comparatively inexpensive to construct and more efficient in operation than those heretofore proposed.

With these and other objects in view the invention consists in the novel details of construction and combinations of parts more fully hereinafter described and particularly pointed out in the claims.

Referring to the accompanying drawings forming a part of this specification, in which like numerals designate like parts in all the views:—

Figure 1 is a diagrammatic side elevational view of a machine made in accordance with this invention, certain parts being broken away;

Fig. 2 is a view similar to Fig. 1, showing the position of the parts after the box has been wired;

Fig. 3 is a top plan view of the parts shown in Fig. 1;

Fig. 4 is a diagrammatic plan view of the motor circuits;

Fig. 5 is a bottom plan view of the parts shown in Fig. 1;

Fig. 6 is a central longitudinal sectional view taken on the line 6—6 of Fig. 3, looking in the direction of the arrows;

Fig. 7 is a cross sectional view taken on the line 7—7 of Fig. 6, looking in the direction of the arrows;

Fig. 8. is a cross sectional view taken on the line 8—8 of Fig. 6, looking in the direction of the arrows;

Fig. 9 is a detail side elevational view of a tripping mechanism in one position;

Fig. 10 is a view similar to Fig. 9 showing the parts in a different position;

Fig. 11 is a sectional detail plan view showing a portion of the parts in Figs. 9 and 10;

Fig. 12 is a fragmentary bottom plan view of a portion of the actuating slide and its associated parts;

Fig. 13 is a view similar to Fig. 12 with the parts shown in a different position;

Fig. 14 is a longitudinal sectional view taken on the line 14—14 of Fig. 12, looking in the direction of the arrows;

Fig. 15 is a fragmentary front elevational view of a portion of the wire twisting mechanism;

Fig. 16 is a fragmentary view of a portion of the parts shown in Fig. 15, when in a different position;

Fig. 17 is a view similar to Fig. 15 with the parts shown in a still different position;

Fig. 17$^a$, Sheet 8, is a view of a modified construction of the lower end of needle arm 60, and its coacting parts;

Fig. 17$^b$, Sheet 8, is a view similar to Fig. 17$^a$ but showing the parts in a different position;

Fig. 18 is a fragmentary partly sectional side elevational view of the parts shown in Fig. 17, together with other portions of the invention.

Fig. 19 is a cross sectional view taken on the line 19—19 of Fig. 15 looking in the direction of the arrows;

Fig. 20 is a view similar to Fig. 19, taken on the line 20—20 of Fig. 17, looking in the direction of the arrows:

Fig. 21 is a fragmentary side elevational view on an enlarged scale of a portion of the parts shown in Fig. 19;

Fig. 22 is a cross sectional view taken on the line 22—22 of Fig. 15, looking in the direction of the arrows;

Fig. 23 is a view similar to Fig. 22 taken on the line 23—23 of Fig. 17, looking in the direction of the arrows;

Figs. 24, 25, 26 and 27 are diagrammatic views illustrating the different positions of the parts during the operation of wiring a box or other package; and Fig. 28 represents the form of twisted knot tied by this machine.

1 indicates the base of any suitable frame work, 2, 3, 4 suitable uprights from said base, and 5 and 6 longitudinal members secured to said upright members. Suitably supported by the frame work is a motor 7 having a drive shaft 8 having a worm 9 engaging the gear 10 on the shaft 11. As will be clear from Fig. 8, the shaft 11 carries the pinion 13 meshing with the gear 14 provided with the shaft 15 mounted in the sleeve 16 rigid with the side or frame member 17. Extending between the longitudinal frame members 5 from end to end of the machine is a floor member 18 slotted, or cut away, at intervals, as will presently appear, to admit the passage of the moving parts.

The gears 10 and 14 project through one of these cut away or slotted portions 19, and on each side of the slot 19 is secured to the floor 18, the angular slide members 20 and 21, on which respectively move the slide plates 22 and 23. Secured to the plate 23, as best shown in Figs. 7 and 8, is the shaft 25, and the filling piece 26. Secured to said shaft 25 and filling piece 26, parallel to the plate 23, is the intermediate plate 27 which carries the cam guides or ways 28 and 29, see Figs. 5, 6 and 8.

Secured to the slide plate 22 is the filling piece 30 carrying the bracing strip, or member 31, secured to the latter is the filling piece 32, and secured to said filling piece 32 is the central or intermediate plate 33 positioned parallel to the plate 27, and spaced apart therefrom, as indicated at 40, Fig. 3, to accommodate the gear 14, as will be clear from Figs. 3, 6, 7 and 8. The slide plates 22, 23, 27 and 33 together with their filling pieces, and other bracing members constitute a sliding plunger designated as a whole by the numeral 35, which is provided with the cover plates 36 and 37.

Said sliding plunger 35 is reciprocated as follows:—Carried by the gear 14, as best shown in Figs. 3, 6 and 8, is the pin 38 on which is mounted the roller 39, located between the cam plates 28 and 29 rigid with the slide plate 27 and the whole plunger 35. It therefore follows that as the gear 14 is rotated by the pinion 13, shaft 11, gear 10, and worm 9, the sliding or reciprocating carriage 35 will be moved back and forth by reason of the plates 22 and 23 sliding on the tracks or ways 20 and 21.

The front portion 41 of the pusher or plunger 35, presents a flat surface for moving a bale, or box 42, from the position shown in Fig. 1, to the position shown in Fig. 2, all as will appear more fully hereinafter.

43 represents a chute, or way, for delivering boxes 42, to the floor 18 of the machine, and 44 indicates an arm mounted on the shaft 25 of the plunger 35 and carrying the pressure members 45 for seizing and firmly holding said box in position during the pushing operation, as will likewise be more fully explained below.

Going back to the shaft 15, see Figs. 2 and 3, the cam 50 is provided with a pin 51 moving in the slotted end 52 of the reciprocating rod 53 carrying the roller 54 against which the surface of said cam takes. Said rod at its other end is connected by the pin 55 to the rocking member 56, rigid with the stud 57 supported by the frame member 58 as shown.

Rigid with the member 56 and rocking therewith is the wire guiding and applying arm 60 having the bent portion 61 and the wire guiding and applying roller 62, all as will be clear from the drawings.

The free lower end of the rocker 56 is provided with the cam surface 63, with the notch 64, and with the toe 65. Riding over said surface 63 is the toe 66 of the lever member 67 supported by the stud 68.

Rigid with said member 67 and rocking therewith is the rocking arm 72 carrying the wire twisting mechanism 73. Said wire twisting mechanism will be best understood from Figs. 15, 16, 17 and 18, and comprises a supporting plate having the flanges 76 and 77. The flange 76 is provided with a slot 78 in which slides the wire holding and guiding pin 79 controlled by the spring 80.

Said flange is also provided with the larger slot 81 through which two of the wire twisting pinions pass, and said flange 76 is likewise provided with a third slot 83 to accommodate the holding dog 84 for a purpose that will presently appear. Said dog 84 is pivoted as at 85 to a projection 86 of the plate 100, and carries the controlling member 88, which is provided with the head 89 and is pivoted as at 90 to said dog 84. Said member 89 at its lower end takes against the inclined surface 91 of the arm 72, and its head 89 is adapted to be struck at intervals by the extreme lower end 93 of the arm 60, as plainly indicated in Figs. 16, 17, and 18, so that said inclined surface 91, as said member 88 is forced downwardly from the position shown in Fig. 15, to the position shown in Fig. 17, will cause said dog to turn on its pivot 85 to release its notched lower end 95 from the lower edge 94 of the orifice 83, as best shown in Fig. 16.

The small supporting plate 100 is provided with a flange 101 in which steps the shaft 102 carrying the pinion 103 operated by the reciprocating and rotatable rack 104; and rigid with said pinion 103 is the sleeve 105 carrying the clutch member 106. Coacting with said clutch member 106 is the clutch member 107, mounted on the enlarged portion 108 of the shaft 102, which enlarged portion is surrounded by the spring 109 and carries the pin 110 operating in the slot 111 with which said clutch member 107 is provided. Said plate 100 is further provided with the lugs 113 and 114 between which the driving pinion 115 is mounted on the said enlarged portion 108. Said lugs are respectively provided with the extensions 116, and 117 between which are journaled the intermediate pinion 118 and the wire twisting pinion 119, all as will be clear from Figs. 15, 17, 19 and 20.

As best shown in Figs. 19 and 21, the wire twisting pinion 119 is provided with a slot 120 which extends slightly beyond the center of said pinion, so that when two strands 121 and 122 of the wire are in the extremity of said slot the center 123 of the pinion will lie between the said strands. Located above the lug 114 and extension 117 is the member 125 having the slot 126, which is only wide enough to accommodate the two strands 121 and 122, while the slot 124 in the extension 117 is wide enough to permit said strands to rotate therein.

Above said slotted member 125 is the cutter 127 pivoted at 128, provided at one end with the extension, or forks 129 and 130, and at its other end with the stop member 131 and cutter member 132. The cutter member 132 extends only to the center, 123, of the pinion 119, and therefore, can cut only the innermost strand 122.

The shaft member 108 extends up through the lugs 113 and 114, and slotted member 125, and is provided with the toe or cam 135 adapted to wipe along the surface 900 of the cutter 127, and operate the latter when the portion 136 is reached, as will be readily understood from Figs. 15, 19 and 20.

The flange 77 is provided with the stop lug 137 against which the member 131 of the cutter takes to stop the motion of the plate 100 on its return swing.

Beneath the lug 113 and extension 116 is located the plate 140, similar in all respects to the plate 125 and provided with a slot 141 also just wide enough to accommodate the two strands 121 and 122, without permitting rotation thereof, see Figs. 21, 22 and 23.

Beneath the slotted plate 140, is a second cutter 142 provided with the looped extension 143 in which rotates the lug or cam projection 144, carried by the shaft member 108 to reciprocate said cutter. Said cutter 142 is provided with the curved portion 146, and a slot 145, see Figs. 21, 22 and 23. The rotation of the shaft 108 and member 144 reciprocates the cutter 142 beneath the holding plate 150 by reason of the closed slot 151 with which said cutter is provided and by reason of the guide screw 152 passing through said plate 150 and into said slot 151. Said cutter 142 is shown in Figs. 21 and 22 in its retracted position, and in Fig. 23 in its extreme forward position, but after leaving its retracted position to reach its forward position it swings slightly on the screw 152 as a center, so that the portion 147 of the cutter, instead of moving in the straight line 153, Fig. 22, will move up to the line 154 for a purpose that will presently appear. As best shown in Fig. 21, the extension 116 is provided with a slot 155 which, like slot 124, is wide enough for both strands 121 and 122 to rotate therein.

It will now be clear that said strands are held against rotation in the slot 126, they are permitted to rotate in the slot 124, they are twisted together by the rotation of pinion 119, they are permitted to rotate in slot 155, and they are held against rotation in slot 141. The result is a well known twisted knot such as is shown in Fig. 28, wherein the part 156 represents those portions of the strands which were acted on by the pinion 119, and the parts 180 and 181 respectively, those portions which were held in the slots 126 and 141.

It will be further observed in Figs. 21, 22 and 23 that the slotted member 140 is provided on one side of its slot 141 with a nick or shoulder 157, and that the strand 121 separates from the strand 122 and lies on this said shoulder. It will be further observed from said figures that the cutting edge 158 of the cutter 142 traverses or crosses this said shoulder 157 to sever said strand 121. The cutting will occur at the point 159, Fig. 21, of the strand 121, so that the cutting edge 158, as the cutter recedes, will carry the severed portion of the wire against the portion 160 of the edge of the plate 150, and tuck or jam said severed portions into the space 161 between said plate 150 and said cutter 142. The severed bight 162 of the strand 121 will, therefore, still be held by the twisting mechanism 73, until the cutter 142 moves outward again ready for another operation, all as will appear more fully hereinafter.

The parts are so timed that the cutter 142 will not move outward again until the wire twisting mechanism or needle 73, has separated from its companion needle or wire applying means 60, 62, as shown in Fig. 6, nor until after the wire has been applied to the package, and until said mechanisms 73 and 62 have again come together as is illustrated in Fig. 18. When the positions of Fig. 18 have been reached, new strands 121, and 122 have assumed the positions shown in said last named figure, and new strand 121 occupies the said shoulder 157. Therefore, when the cutter 142 begins to move outwardly, it swings on its pivot 152 in the manner above described, so that the portion 147, Fig. 23, will move out of the way of said new strand 121; and later said cutter moves in an opposite direction on its pivot so that said new strand 121 will occupy the notch 145 and lie in the receding path of the cutting edge 158.

That is to say, when the whole needle 73 moves downwardly, the strand 162 held by it passes up over the face of the plate 76 to the spring pressed lug 79, see Figs. 1, 6 and 24; and when the box 42 advances the said strand is passed over said lug 79, see dotted lines Fig. 24, whereupon the needle 73 rises and the needle 60 falls, and the parts successively assume the positions shown in Figs. 25, 26 and 27 all as will appear more fully hereinafter.

In order to automatically pick up the two strands of the wire around the box, the wire twisting needle 73 is thrown from the position shown in Fig. 15 to that shown in Fig. 17 by the lower end of the needle 60 contacting with the pivoted member 89, as explained above, and in order to restore the parts from the position shown in Fig. 17 to that shown in Fig. 15, and thus automatically disengage the needle 73 from the twisted wire, the member 170 of the dog 84 contacts with a stop 171 on the frame during the downward descent of said needle 73, see Fig. 17.

There is provided a pair of wire guiding arms 60 and also a pair of arms 72 for holding a pair of twisting devices, so that a pair of wires 200 may be put around the box, or bale, but as the mechanism associated with one arm 60 or 72 is a duplicate of the mechanism associated with the corresponding other arm, a single description will suffice for both.

As will be clear from Figs. 1 and 3, each of the arms 60 is provided with the bent portions 61 through which pass the rods 201, 202, and 203, rigid with said portions 61, as well as the screw threaded rod 204, rotatable in said portions 61.

Overlapping these said bent portions 61 are the rearwardly extending portions 205 of the rocking arms 60, through which loosely pass said rods 202 and 203, so that said portions 205 are freely slidable laterally or adjustable on said last named rods. Said members 205 are further provided with the nut like members 206, engaging the screw threaded rod 204, so that by turning said rod 204, the arms 60 and wires 200 may be readily adjusted to and from each other according to the size of the boxes 42 to be wired. Flanged plates 207 are also carried by said adjustable rear extensions 205 of said arms 60 and passing through said plates are the rods 208 surrounded by the springs 209, and pivotally secured at their lower ends to the arms 210 as at 211. Said arms 210 are conveniently pivoted to the frame as at 212, and are provided with the presser feet 213 pivoted to said arms as at 214. 215 indicates a rib member joining the members 61 on each side of the machine, and causing them to rock in unison as will be clear from Figs. 3 and 6.

As will be clear from Figs. 1, 5 and 6, the supporting rocking arms 72 are provided with the bent members 218 through which passes the rod 219 and said members 218 are secured to the straight members 220, through which said rod 219, also passes, while through said members 220 pass the rods 221 and 222. Said rods 219, 221, and 222 are rigid with the members 218 and 220, while they loosely pass through the supporting member 72, as will be best understood from Fig. 5.

Said supporting members 72 are provided with the loop like nut members 223 rotating on the right and left hand screw threads 224 of the adjusting rod 225. As is the case with the wire manipulating arms 60, the supporting arms 72 are adjustable on the rods 222, 221 and 219 by the turning of the screw shaft 225, as will be readily understood. Of course, when the arms 72 are thus adjusted to or from each other, the wire twisting mechanism 73 will be likewise adjusted to or from each other. Slidably mounted in the loop like nut members 223 are the sleeves 230, and located in said sleeves and rotatable therein are the rack bars 104 which actuate the pinions 103 for operating the wire twisting mechanism shown in Figs. 15, 16, and 17. These said rack bars 104 being rotatable on their longitudinal axes, the wire twisting mechanism including the supporting plate 100 is likewise rotatable on said axes. Secured to the rods 221 and 222 is the reciprocating rod 231 to one end of which is attached to pivoting member 232 provided with the hook like slot 233 taking over the pin 234, carried by the slide member 235 which imparts a reciprocating motion to the members 232, 231 and 230, and the rack bars 104, all in a manner which will be presently described.

When operating the machine the boxes or packages of a given length are segregated, and it being determined how far apart the wires are to be placed, the screw threaded shaft 225 is adjusted to separate the needle arms 72 the proper distance, and in like manner the screw threaded shaft 204, Fig. 3, is turned to separate the needle arms 50, the same distance, so that the upper arms 60 will come opposite the lower arms 72 and needles 73. Apertures 910 are provided in the floor 18 to accommodate the needles 73; and spaces 915 and 916 are provided between the parallel plates of the reciprocating plunger 35 to accommodate both the needles 60 and 73 during the wire tying operation.

Mounted on the reciprocating slide plate 27 of the plunger 35 is the rigid member 236, see Fig. 6, and pivoted to said member 236 as at 237 is the sliding bar 238 as best shown in Figs. 6, 12, 13 and 14. 239 and 266 represent slidable guides for the reciprocating bar 238, and pivoted to said bar as at 240 is the latch or dog 241 having the pin 242 moving in the slot 243 formed by the cutaway member 244 secured to one side of the bar 238. To one side of the reciprocating guide 239 is located the stationary member 245 having the slotted or cut away portion 246 terminated by the cam surfaces 247 and 248. The slidable guide 239 is provided with the cut away portion 249 terminated by the abrupt shoulders 250 and 251. The guide 266 is provided with the cutaway portion 252 terminated by the abrupt shoulders 253 and 254, with the second cutaway portion 255 terminated by the shoulders 256 and 257, and with the third cutaway portion 258 terminated by the shoulders 259 and 260. The pin 234 joins said guides 239 and 266 and thus causes them to move together, as well as to transmit motion to the member 232.

Pivoted to one side of the guide 266 as at 261 is the latch lever 262 controlled by the spring 263, provided with the cam shaped end 264 and the square shaped lug 265.

The slot 243 formed in the bar 244 is terminated by the abrupt surface 267 and the cam surface 268 joins said slot 243 with a second slot 269 leading to a third slot 270 having the abrupt termination 271 at one end, and the cam surface 272 at its other end.

It will thus be seen if the parts are in the position shown in Figs. 12 and 14, and if the plunger plate 27 moves to the right as seen in Fig. 6, the bar 238 will move toward the right as seen in Figs. 6, 12 and 14, carrying one end of the pin 242 in the slot 243, along the cut away portion 246 until the cam shoulder 268 is reached, when said pin will be forced downward and its other end will contact with the surface 274 of the latch lever 262, thus unlocking the guide bar 266. The pin 242 will now continue its movement in the slot 269 until it contacts with the shoulder 251, whereupon the guide bars 239, 266 and pin 234 will be moved to the right until the curved shoulder 248 is reached, whereupon the pin 242 will disengage the guide bar 239, and the motion of the latter and of the rack bars 104 will cease. The pin 242, however, will continue on with its last motion in the slot 270 until the plunger plate 27 stops. On the return stroke of said plunger plate, said pin first strikes the curved shoulder 272, is forced down into slot 269, strikes against the curved surface 276 of the latch 262, unlocks the guide bars and pin 234, whereupon it continues its last motion until the shoulder 253 is reached. After said shoulder is struck by pin 242, the guide bars 239, 266 and pin 234 again take up their motion and move the rack bars 104 to perform the wire twisting operation, until the curved surface 247 is reached, whereupon, a second last motion begins and continues up to the end of the stroke.

It will thus be seen that the operation of the wire twisting mechanism through the rack bars takes place only during the middle of the stroke, and that the duration of said operation is governed by the length of the cutaway portion 246, which may be changed at will by changing the strip 245.

The operation from the mechanism so far described is as follows: The motor 7 being started the shaft 8 will turn gear 10, shaft 11, pinion 13 and gear 14, carrying roller 39 moving between the cam guide ways 28 and 29 rigid with plate 27 which in turn is rigid with plunger 35. The revolution of roller 39 as will be best understood from Fig. 6, will cause plunger 35 to reciprocate and to move boxes 42 or other packages brought by chute 43 in front of said plunger, from the position shown in Fig. 1 to the position shown in Fig. 2. During this last named operation, the toe 300 loosely mounted on the shaft 25 slides along the stationary way 301, carried by the frame of the machine. Said toe holds the spring 302 under compression which controls the turning of the arm 44 of said shaft 25 by reason of its pressure against the lug 303 rigid with said shaft and arm. The turning of the arm 44 causes the feet 45 to yieldingly seize the box 42 and to hold it in position for wiring.

Further, as explained above there are two needle arms 60 and also a pair of needles 73, so that there are two bights 200 of wire in the path of said box 42. As will be best understood from Fig. 24, the movement of the box 42, first causes said wire to partially encircle the same, whereupon the continued rotation of shaft 14 and cam 50, causes, through the movement of rod 53, the rotation of the lever members 56 and 67 on their respective pivots 57 and 68, and the approach toward each other of the needle arms 60 and 72, all as will be clear from Fig. 1. This approach continues until the parts are in the position shown in Fig. 25, and continues until they reach the position shown in Fig. 26, whereupon, the portions 304, 305, and 306 of the wire have encircled the box and the further portion 307 has overlapped the extension or strand 122 of the bight 162, and itself has become the strand 121 of Figs. 18 and 21.

The strands 121 and 122 being thus crossed on the surface of the box or package, the parts are so timed that the end 93 of the needles 60 will strike their corresponding flanges 89 and cause the wire twisting pinion 119 to move from the position shown in Fig. 15 to that shown in Fig. 17, and to thus pick up said strands and cause them to enter the slot 120 of each pinion all as will be clear from the preceding disclosure. In order to cause the pinion slots to lie as close to the surface of the box as possible, the flange 77, Fig. 19 is cut away as will be clear from the dotted line 310, Fig. 19. The rack bars 104 are now actuated in the manner set forth, and said pinions 119 twist the strands of wire into the knot shown in Fig. 28. The lost motion necessary in operating the rack bars 104 is obtained through the mechanism above described in connection with Figs. 12, 13 and 14, and the strands 121 and 122 are severed by the mechanism above described in connection with Figs. 18 to 23, the severed end of the wire, or bight 162, being automatically retained by the needle or twisting mechanism 73, so that as the needle members 60 and 73 separate under the continued revolution of the cam 50 and shaft 51, the wire 200 still passes from the supply, not shown, over the guide wheels 62, across the path of the box 42 and to the needle 73 where it is securely held in the manner above described in connection with Fig. 21.

The wire strands having been severed in the manner disclosed, the gear 14 continuing its rotation, the roller 39 after having contacted with plate 29 to force the plunger 35 forward, will now contact with plate 28 to start the plunger back. Said toe 300 when the box has reached its wiring position, had also reached the end of its track or slide 301 and slipping over said end was enabled to release the pressure of the feet 45 and also to change from the position shown in Fig. 9 to that shown in Fig. 10. Therefore, as the slide or plunger 35 moves back said toe retreats until the hole 312 is reached, whereupon, it is ready for another forward excursion.

As the box reaches its wiring position the presser feet 213 yieldingly compress it under the action of the springs 209, as will be readily understood from the above disclosure, and as there is more or less friction in the feeding of the wire over the wheel 62, said wire is drawn taut around the box and tied while the latter is under compression.

When the box 42 passed from the chute 43 to the floor 18, see Fig. 7, it struck the projection 350, of the rod 351 having the rack bar 352 controlled by the spring 353, and meshing with the pinion 354, which latter meshes with the gear 355 carried by clutch member 381, loosely carried by the shaft 356 on which is secured the switch 357, see Figs. 2, 4, and 5, and which coacts with the contacts 358 and 359, to make circuit with the wires 360 and 361.

When said circuit is made, current from the lead wire 262 passes through switch 363, carried by shaft 364 on which is mounted the star wheel 365, and from said switch the current traverses wire 361, contact 359, switch 357, contact 358, wire 360, motor 7, and wire 366 back to the supply. The motor 7 is thus automatically started by the box to be wired, and it continues to run and to put into action the above disclosed wiring operations until said box leaves the projection 350, whereupon the spring 353 pulls the rack 352 back, but this motion does not affect the switch 357, for said switch is only turned through the rotation of the clutch member 380, turning with shaft 356, see Figs. 2 and 5, and the reversal of the motion of said rack only turns idly, the clutch member 381, which is loose on said shaft. But the parts are so timed that at the end of the wiring operation, the pin 367 carried by the gear 14 strikes the star wheel 365 and so turns the switch 363 that it will break the circuit just described, and make circuit with the contacts 368 and 369, and wire 370.

The circuit through the motor 7 will remain thus broken until another box pushes the rack 352 in the proper direction to again turn the switch 357 through 90° or from its dotted line position shown in Fig. 4 to its full line position. Circuit will now be again made through the motor until the pin 367 again breaks it by turning switch 363 through 90°. In fact the motor will be automatically started after each box is delivered to the machine, and will continue to run until said box is completely wired, and will then automatically stop.

In the modified details of construction shown in Figs. 17ᵃ and 17ᵇ Sheet 8, instead of providing the frame with the shoulder 171, see Fig. 17, for the toe 170 to strike against, I provide each of the needle arms 60 with an extension 600, and each extension I provide with the hole 601. It results that as the arms 60 descend, their edges 602 will contact with the members 89, thus tilting the dogs 84 on their centers 85 and causing the toes 170 to enter the holes 601 all as will be clear from Fig. 17ᵃ.

Later, when the arms 60 ascend, the dogs 84 will be swung in the reverse direction around their pivots 85 and the parts thus restored to the positions shown in Fig. 15.

It will now be clear that the needles or arms 60 and 72 constitute automatic means for placing the wire 200 across the path of movement of the box, bundle, or other parcel 42; that the plunger 35 and its coacting parts, such as the rod 53, levers 56 and 67 etc., constitutes automatic means for causing the wire to encircle said box; that the racks 104 and their coacting parts constitute power driven means for causing the needle twisting mechanism to twist the wire into the knot shown in Fig. 28; and that the chute 43 and circuit controlling mechanism, its motor and coacting parts, shown in Fig. 4, constitute automatic means for starting the machine, continuing its operation until the box is wired and then stopping same.

It should be further observed that the power driven wire twisting and cutting mechanism shown in Figs. 15 to 23 is capable of use independently of the other parts of the machine.

It is obvious that those skilled in the art may vary the details of construction as well as the arrangement of parts without departing from the spirit of the invention and therefore I do not wish to be limited to the above disclosure except as may be required by the claims.

What I claim is:—

1. In a wire tying machine the combination of means to place a wire across the path of a package to be wired; means to cause the wire to partially encircle said package; means comprising an adjustable pair of opposing needle arms to cause the wire to completely encircle said package; and means to twist parallel disposed bight portions of said wire together after said package is completely encircled, substantially as described.

2. In a wire tying machine the combination of means to automatically place a wire across the path of a package to be wired; means comprising an adjustable pair of opposing needle arms to automatically cause the wire to partially encircle said package; means to automatically cause the wire to completely encircle said package; and means to automatically twist parallel disposed bight portions of said wire together after said package is completely encircled, substantially as described.

3. In a wire tying machine the combination of means comprising an adjustable pair of oppositely moving needle arms to place a wire across the path of a package to be wired; means comprising a movable plunger to cause the wire to partially encircle said package; means operating said needle arms to automatically cause the wire to completely encircle said package; and means to twist parallel bight portions of said wire together after said package is completely encircled, substantially as described.

4. In a wire tying machine the combination of a power shaft; a plunger operated by said shaft adapted to move a package to be wired; means comprising adjustable oppositely moving needle arms for causing a wire to automatically surround said package; and means operated by said shaft for tying two parallel disposed parts of said wire together, substantially as described.

5. In a wire tying machine the combination of a power shaft; a plunger operated by said shaft adapted to move a package to be wired; means comprising an adjustable pair of opposing needle arms operated by said shaft for causing a wire to automatically surround said package; and means comprising a wire twisting pinion operated by said shaft for tying two parallel overlapping parts of said wire together, substantially as described.

6. In a wire tying machine the combination of a power shaft; a reciprocating plunger operated by said shaft adapted to move a package to be wired; means comprising an adjustable pair of opposing needle arms for causing a wire to automatically surround said package; and means operated by said shaft for tying two parallel overlapping parts of said wire together, substantially as described.

7. In a wire tying machine the combination of a reciprocating plunger adapted to move a box over a fixed path; an adjustable pair of opposing needle arms adapted to place a wire across said path to partially encircle said box; means for moving said needle arms to cause the wire to completely encircle said box; and power driven means for twisting two parallel overlapping portions of said wire together, substantially as described.

8. In a wire tying machine the combination of a reciprocating plunger adapted to automatically move a box over a fixed path; an adjustable pair of opposing needle arms adapted to automatically place a wire across said path to partially encircle said box; means for automatically moving said arms to cause the wire to completely encircle said box; and power driven means for twisting two parallel overlapping portions of said wire together, substantially as described.

9. In a wire tying machine the combination of means for automatically placing a wire around three sides of a box; a needle arm adapted to partially encircle with wire the remaining side; another needle arm adapted to complete the encircling with wire of said remaining side; means to adjust said needle arms lengthwise of the box; and means to twist together bights of said wire extending parallel to the surface of said box, substantially as described.

10. In a wire tying machine the combination of means for automatically placing a wire around three sides of a box; an adjustable needle arm adapted to automatically partially encircle with wire the remaining side; another adjustable needle arm adapted to automatically complete the encircling with wire of said remaining side; and wire twisting means for securing together two parts of the wire into a knot extending parallel to the surface of said box, substantially as described.

11. In a wire tying machine the combination of means for automatically placing a wire around three sides of a box; means comprising two automatically operated needle arms for placing two parallel overlapping strands of said wire over the fourth side of said box; and means for twisting said strands together, substantially as described.

12. In a wire tying machine the combination of means for automatically placing a wire around three sides of a box; means comprising two opposing automatically operated needle arms for placing two parallel overlapping strands of said wire over the fourth side of said box; one of said arms adapted to pull the wire from the bottom side of the box, and the other arm adapted to pull the wire from the top side of said box; and means for twisting said strands together, substantially as described.

13. In a wire tying machine the combination of a plunger adapted to move a box to be wired; a power shaft; gear connections between said shaft and plunger for reciprocating the latter; a pair of adjustable and oppositely movable needle arms; connections by which said needle arms and plunger are adapted to automatically and completely encircle the four sides of a box with wire; and means for twisting two parts of the said wire together into a knot disposed parallel to the surface of said box, substantially as described.

14. In a box strapping machine the combination of a plunger adapted to move a box into position for wiring; a needle arm provided with wire twisting means; a needle arm provided with wire guiding means; means for adjusting said needle arms lengthwise of said box; connections by which said needle arms and plunger are adapted to completely encircle the four sides of said box with wire; and power means for operating said wire twisting means, substantially as described.

15. In a box strapping machine the combination of a plunger adapted to automatically move a box into position for wiring; a needle arm provided with wire twisting means; a needle arm provided with wire guiding means; means for adjusting said needle arms lengthwise of the box; connections by which said needle arms and plunger are adapted to automatically completely encircle the four sides of said box with wire and to provide strands of wire disposed parallel to the surface of said box for engagement with said wire twisting means; and power means for operating said wire twisting means, substantially as described.

16. In a wire tying machine the combination of means for automatically encircling a package with wire comprising a pair of opposing needle arms carrying said wire, and wire twisting means; means for adjusting said needle arms lengthwise of the box; means for compressing said package during the encircling operation; and automatic means for twisting said wire while said package is under compression, substantially as described.

17. In a wire tying machine the combination of means for automatically encircling a package with wire comprising a pair of opposing needle arms carrying said wire and wire twisting means; means for adjusting said needle arms lengthwise of the box; power means for operating said arms and twisting means; means for placing the wire under tension after the encircling operation is complete; means for compressing said package during the encircling operation; and automatic means for twisting said wire while said package is under compression, substantially as described.

18. In a wire tying machine the combination of means adapted to automatically encircle a package with wire; and to provide parallel strands of wire on one side of said package, said means comprising a wire twisting mechanism adapted to receive said parallel strands; and means to move said wire twisting mechanism to pick up said strands, substantially as described.

19. In a wire tying machine the combination of means adapted to automatically encircle a package with wire, to put said wire under tension, and to provide parallel strands of wire on one side of said package, said means comprising a wire cutting and twisting mechanism adapted to receive said parallel strands; and automatic means to move said wire twisting mechanism to pick up said strands, substantially as described.

20. In a wire tying machine the combination of means adapted to automatically encircle a package with wire to put said wire under tension, and provide parallel strands of wire on one side of said package, said means comprising a wire cutting and twisting mechanism adapted to receive said parallel strands; automatic means to move said wire twisting mechanism to pick up said strands; means to operate said twisting and cutting mechanism; and means to move the latter away from said strands after the cutting operation, substantially as described.

21. In a wire tying machine the combination of means comprising a plunger and pivoted needles carrying wire twisting and cutting mechanism; said means adapted to automatically compress the packages to be wired, to encircle the same with wire under tension, to tie the wire while said boxes are under compression, and to stop the mechanism after the tying operation, substantially as described.

22. In a wire tying machine the combination of a plunger adapted to move a box to its wire tying position; a compression means adapted to yieldingly compress the box while in said position and to yieldingly release said box after the tying operation; means for encircling said box with a wire under tension; and means for tying and cutting said wire while under tension and while said box is under compression, substantially as described.

23. In a wire tying machine the combination of a reciprocating plunger adapted to move a box to its wire tying position; a compression means actuated upon the return movement of said plunger, adapted to yieldingly compress the box while in said position and to yieldingly release said box after the tying operation; means for encircling said box with a wire under tension; and means comprising a power driven pinion for tying and cutting said wire while under tension and while said box is under compression, substantially as described.

24. In a wire tying machine the combination of means comprising a plurality of pairs of opposing needle arms to automatically encircle a box with a plurality of wires; means to adjust a portion of said encircling means lengthwise of the box to vary the distance said wires are to be spaced apart; and means to twist together parallel bights of said wire, substantially as described.

25. In a wire tying machine the combination of means comprising a plurality of pairs of opposing needle arms to automatically encircle a box with a plurality of wires; means to adjust a portion of said encircling means lengthwise of the box to vary the distance said wires are to be spaced apart; and automatic means comprising slotted pinions to tie parallel bights of said wires together after the encircling operation is completed, substantially as described.

26. In a wire tying machine the combination of means to automatically encircle a box with a plurality of wires comprising a plurality of pairs of needle arms; means to adjust a portion of said encircling means comprising said arms lengthwise of the box to vary the distance said wires are to be spaced apart; and power driven wire twisting means carried by some of said arms for twisting portions of said wire together, substantially as described.

27. In a wire tying machine the combination of a support to receive packages to be wired; a power shaft; means adapted to be actuated by the package for starting said shaft; means actuated by said shaft after being started for encircling said package with wire and tying the same in place; and means actuated by said last named means for stopping said shaft after the completion of the tying operation, substantially as described.

28. In a wire tying machine, the combination of a plunger adapted to move a box to a wiring position; a set of needle arms provided with wire twisting and cutting means; a second set of needle arms adapted to hold and guide the wire and coacting with said first mentioned set; and means for synchronously operating said plunger, needle arms, and wire twisting and cutting mechanisms, substantially as described.

29. In a wire tying machine the combination of a plunger adapted to move a box to wiring position; a set of needle arms provided with wire twisting and cutting means; a second set of needle arms adapted to hold and guide the wire and coacting with said first mentioned set; and means comprising an automatically starting and stopping mechanism for synchronously operating said plunger, needle arms, and wire twisting and cutting mechanisms, substantially as described.

30. In a wire tying machine the combination of a wire twisting pinion adapted to receive parallel strands of wire and to twist them together; means for holding portions of said strands against rotation on each side of said pinion; means for cutting a different strand on each side of said pinion; and power driven means for effecting the twisting and cutting operations, substantially as described.

31. In a wire tying machine the combination of a wire twisting pinion adapted to receive parallel strands of wire and to twist them together; means for holding portions of said strands against rotation on each side of said pinion; means for cutting a different strand on each side of said pinion; power driven means for effecting the twisting and cutting operations; means for encircling a box with wire; and means for retaining one end of the severed wire to facilitate a subsequent wire encircling operation, substantially as described.

32. In a wire tying machine the combination of a wire twisting pinion adapted to receive parallel strands of wire and to twist them together; means for holding portions of said strands against rotation on each side of said pinion; means for cutting a different strand on each side of said pinion; power driven means for effecting the twisting and cutting operations; and means for holding one end of the severed wire for another operation, substantially as described.

33. In a wire tying machine the combination of a pair of pivoted needle arms adapted to move toward and from each other; means for adjusting said arms lengthwise of the box; means associated with one arm for causing the to and fro movements of the other; and wire twisting means carried by one of said arms adapted to twist a knot disposed parallel to the surface of said box, substantially as described.

34. In a wire tying machine the combination of a pair of pivoted needle arms adapted to move toward and from each other; a reciprocating plunger provided with a recess to receive said arms; means associated with one arm for causing the to and fro movements of the other; wire twisting means carried by one of said arms; and power means for actuating said wire twisting means, substantially as described.

35. In a wire tying machine the combination of a pair of sets of opposing needle arms; connections by which one arm of each set operates the other arm of the same set; wire twisting means carried by one arm of each set; a reciprocating plunger provided with a recess for each set; and connections for operating said plunger, said arms, and said wire twisting mechanism, in synchronism, substantially as described.

36. In a wire tying machine the combination of a plurality of pairs of needle arms adapted to encircle a box with wire; means for adjusting said pairs to and from each other lengthwise of the box; means for twisting together portions of said wire carried by each pair; and power driven means for operating said twisting means, substantially as described.

37. In a wire tying machine the combination of a plurality of pairs of needle arms adapted to encircle a box with wire; means for adjusting said pairs to and from each other; automatic means for subjecting a box to the action of said pairs of arms; means for twisting together portions of said wire carried by each pair; wire cutting means associated with said twisting means; and power driven means for operating said twisting means, substantially as described.

38. In a wire tying machine the combination of a plurality of pairs of needle arms adapted to encircle a box with wire; means for adjusting said pairs to and from each other; means associated with said arms for compressing the box during the encircling operation; means for twisting together portions of said wire carried by each pair; and power driven means for operating said twisting means while the box is under compression, substantially as described.

39. In a wire tying machine the combination of a pair of needle arms adapted to encircle a box with wire; means for adjusting said pairs of arms lengthwise of the box; compressing means adapted to compress said box during the encircling operation; means carried by one of said arms provided with a wire twisting mechanism; and means associated with said wire twisting mechanism for causing the latter to automatically receive portions of the wire and twist them together, substantially as described.

40. In a wire tying machine the combination of means to encircle a box with wire having parallel bights located parallel to the box and comprising a wire twisting means; means to swing said twisting means to and from the bights of wire to be twisted; and power means for actuating said twisting means, substantially as described.

In testimony whereof I affix my signature.

PARVIN WRIGHT.